United States Patent
Leach et al.

(10) Patent No.: US 10,965,533 B1
(45) Date of Patent: *Mar. 30, 2021

(54) DYNAMIC CLUSTERING OF NETWORK NODES FOR MOBILE COMMUNICATIONS

(71) Applicant: Ibotta, Inc., Denver, CO (US)

(72) Inventors: Bryan Leach, Denver, CO (US); Luke Swanson, Denver, CO (US); Garrick Wager, Arvada, CO (US)

(73) Assignee: IBOTTA, INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,792

(22) Filed: Oct. 8, 2019

Related U.S. Application Data

(63) Continuation of application No. 15/847,368, filed on Dec. 19, 2017, now Pat. No. 10,484,246.

(60) Provisional application No. 62/436,343, filed on Dec. 19, 2016.

(51) Int. Cl.
*H04L 12/24* (2006.01)
*H04W 84/18* (2009.01)
*H04L 12/911* (2013.01)
*H04W 92/02* (2009.01)

(52) U.S. Cl.
CPC .......... *H04L 41/0893* (2013.01); *H04L 41/12* (2013.01); *H04L 47/828* (2013.01); *H04W 84/18* (2013.01); *H04W 92/02* (2013.01)

(58) Field of Classification Search
CPC ... H04L 41/0893; H04L 41/12; H04L 47/828; H04L 65/602; H04W 84/18; H04W 92/02; G06F 16/9024; G06F 40/242; G06Q 30/025; G06Q 30/0215; G06Q 30/0233; G06Q 30/0242; G06Q 50/00
See application file for complete search history.

(56) References Cited

U.S. PATENT DOCUMENTS

| | | | |
|---|---|---|---|
| 2016/0005067 A1* | 1/2016 | Warner | G06Q 30/0233 705/14.27 |
| 2016/0247175 A1* | 8/2016 | Milton | G06Q 30/0205 |
| 2016/0253694 A1* | 9/2016 | Kozareva | G06Q 30/0242 705/14.41 |
| 2016/0323343 A1* | 11/2016 | Sanghavi | H04L 65/602 |
| 2017/0053208 A1* | 2/2017 | Krishnamurthy | G06F 16/9024 |
| 2017/0098234 A1* | 4/2017 | Carlson | G06Q 30/0215 |

(Continued)

OTHER PUBLICATIONS

U.S. Appl. No. 15/847,368 Notice of Allowance dated Jul. 25, 2019.
U.S. Appl. No. 15/847,368 Office Action dated May 31, 2019.

*Primary Examiner* — Lee H Luu
(74) *Attorney, Agent, or Firm* — Wilson Sonsini Goodrich & Rosati

(57) ABSTRACT

Provided are systems and methods for segmenting and grouping a plurality of network nodes into one or more clusters. Content may be delivered from a transmitting user node to a receiving user node based on which cluster the receiving user node resides. The grouping of the clusters may be dynamically updated in real-time based on user activity data. Such user activity data may be collected from both a transmitting user node (e.g., server) and a receiving user node (e.g., user device) to map the delivery of a relevant communication. Advantageously, a transmitting user may deliver content to other relevant users and a receiving user may receive content from other relevant users.

16 Claims, 6 Drawing Sheets

(56) References Cited

U.S. PATENT DOCUMENTS

2017/0148051 A1*  5/2017  Bagheri .............. G06Q 30/0246
2017/0149852 A1*  5/2017  Selekman ............. G06Q 50/00
2017/0192953 A1*  7/2017  Miklos ................. G06F 40/242

* cited by examiner

DYNAMIC CLUSTERING OF NETWORK NODES FOR MOBILE COMMUNICATIONS

CROSS-REFERENCE

This application is a continuation of U.S. patent application Ser. No. 15/847,368, filed Dec. 19, 2017, which claims the benefit of U.S. Provisional Application No. 62/436,343, filed Dec. 19, 2016, each of which applications is entirely incorporated herein by reference.

BACKGROUND

A computer network may facilitate the exchange and/or delivery of data packets, or communications, between multiple client nodes. Often, the same communications may be broadcast to all nodes. However, this may create unnecessary traffic over the network and an overload of information for the recipient users. Further, the transmitting user may find it difficult to track the broadcasted communication with each recipient user. This problem has intensified with the increasing use of mobile devices that allows for the timeless and remote transmission, receipt, and access of data by users. In order to facilitate more efficient communication between users, a more sophisticated approach towards the generation and distribution of communications may be required.

SUMMARY

Recognized herein is the need to deliver highly customized, relevant, mobile communications to select user nodes in a computer network. Systems and methods described herein provide transmitting users with an online/mobile platform configured to deliver dynamically segmented communications to recipient users and track relevant user performance metrics of such communications.

In an aspect, provided is a method for delivering content to a given cluster of receiving nodes in a computer network, comprising: receiving, over the computer network, a first set of user data from a transmitting node associated with a transmitting user, the first set of user data comprising user activity data of each of a plurality of users with respect to the transmitting user; receiving, over the computer network, a second set of user data from each node associated with each of the plurality of users, the second set of user data comprising user activity data of each of the plurality of users stored by each node; segmenting a plurality of receiving nodes, in the computer network, into a plurality of clusters of nodes based at least in part on the first set of user data and the second set of user data, wherein the plurality of receiving nodes comprises the each node associated with each of the plurality of users; receiving, over the computer network, a communication content from the transmitting node, wherein the communication content is associated with a rule data, wherein the rule data comprises one or more identifiers for one or more clusters of receiving nodes; mapping, based on the one or more identifiers in the rule data, the communication content to the one or more clusters of receiving nodes; and delivering, over the computer network, the communication content to a plurality of receiving nodes belonging to the one or more clusters.

In some embodiments, the method further comprises dynamically updating the plurality of clusters of nodes upon receiving an update of the first set of user data, an update of the second set of user data, or both. In some embodiments, the plurality of clusters of nodes are dynamically updated in real-time.

In some embodiments, a first receiving node of the plurality of receiving nodes is segmented into at least two different clusters of nodes in the plurality of clusters of nodes.

In some embodiments, the user activity data in the first set of user data comprises one or more of a user identifier, user contact information, geographic distance from the transmitting user, user relationship duration with the transmitting user, and frequency of user interaction with the transmitting user.

In some embodiments, the user activity data in the second set of user data comprises a user identifier, user contact information, user demographic information, and user account history.

In some embodiments, the rule data further comprises geographic regions of eligibility, age restrictions, or both for the communication content.

In some embodiments, the segmenting comprises matching the first set of user data and the second set of user data.

In some embodiments, a given receiving node is grouped to a given cluster of nodes based at least in part on one or more of (i) a geographic location, (ii) user relationship duration with the transmitting user, (iii) frequency of user interaction with the transmitting user, (iv) demographic, (v) user behavioral information, and (vi) user psychographic information, of a given receiving user associated with the given receiving node.

In some embodiments, the communication content is activatable by the plurality of receiving nodes.

In some embodiments, the method further comprises tracking an activation of the communication content by the plurality of receiving nodes and storing the activation activity in the first set of user data, the second set of user data, or both.

In another aspect, provided is a computer system for delivering content to a given cluster of receiving nodes in a computer network, comprising: a network adaptor in communication with the computer network, wherein the network is in communication with a plurality of nodes including a transmitting node and a plurality of receiving nodes; one or more databases comprising a first set of user data received from the transmitting node, a second set of user data received from each of the plurality of receiving nodes, a communication content associated with a rule data, wherein the first set of user data comprises user activity data of each of a plurality of users associated with each of the plurality of receiving nodes, respectively, with respect to a transmitting user associated with the transmitting node, wherein the second set of user data comprises user activity data of the each of the plurality of users stored at each of the plurality of receiving nodes, respectively, and wherein the rule data comprises one or more identifiers for one or more clusters of receiving nodes; and one or more processors, individually or collectively, configured to: segment the plurality of receiving nodes, in the computer network, into a plurality of clusters of nodes based at least in part on the first set of user data and the second set of user data; and use the network adaptor to map and deliver the communication content to each receiving node belonging to the one or more clusters of receiving nodes.

In some embodiments, the one or more processors are further configured to dynamically update the plurality of clusters of nodes upon receiving an update of the first set of user data from the transmitting node, an update of the second set of user data from one of the plurality of receiving nodes, or both. In some embodiments, the one or more processors are further configured to dynamically update the plurality of clusters of nodes in real-time.

In some embodiments, the user activity data in the first set of user data comprises one or more of a user identifier, user contact information, geographic distance from the transmitting user, user relationship duration with the transmitting user, and frequency of user interaction with the transmitting user.

In some embodiments, the user activity data in the second set of user data comprises a user identifier, user contact information, user demographic information, and user account history.

In some embodiments, the rule data further comprises geographic regions of eligibility, age restrictions, or both for the communication content.

In some embodiments, the one or more processors are configured to match the first set of user data and the second set of user data to segment the plurality of receiving nodes into the plurality of clusters of nodes.

In some embodiments, the one or more processors are configured to segment the plurality of receiving nodes based at least in part on one or more of (i) a geographic location, (ii) user relationship duration with the transmitting user, (iii) frequency of user interaction with the transmitting user, (iv) demographic, (v) user behavioral information, and (vi) user psychographic information, of a given receiving user associated with a given receiving node of the plurality of receiving nodes.

In some embodiments, the communication content is activatable by the each receiving node.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Embodiments disclosed herein may provide numerous advantages over traditional methods of communication. First, traditional communications content may be distributed offline or in a web-browsing environment where all users are anonymous. Thus, individuals are able to access the same available content, and transmitting users are left without full control of which user views or reacts to their communication. The disclosed embodiments, however, may provide transmitting users with systems and methods for a segmented, tiered approach to the distribution of communications based on, for example, the receiving users' relationship with the transmitting user. For example, the relationship may be indicative of geographic affinity, relative degrees of loyalty, length of relationship, and the like between the transmitting user and the respective receiving user. Each individual can be presented with a different communication via, for example, one's mobile device. A communication may be presented in a mobile application installed on a mobile device, and users may be required to log in to the mobile application to receive, view or activate a communication.

Second, the disclosed embodiments may provide approaches for delivering segmented communications based on the likelihood of each user segment to react to particular communications content. Embodiments disclosed herein may provide tracking, reporting, and other data analytics to accurately measure the efficacy of any data delivery project.

Third, provided are systems and methods to deliver highly customized, relevant communications content. By leveraging sophisticated data aggregation methods and algorithms, disclosed embodiments can be configured to show different content, for example, one version of creative content to receiving users with pre-existing or longer relationships with the transmitting user and another version to new receiving users or receiving users that have been out of communication with the transmitting user for a certain duration.

Dynamic Clustering of Network Nodes for Mobile Communication

Figure 1:
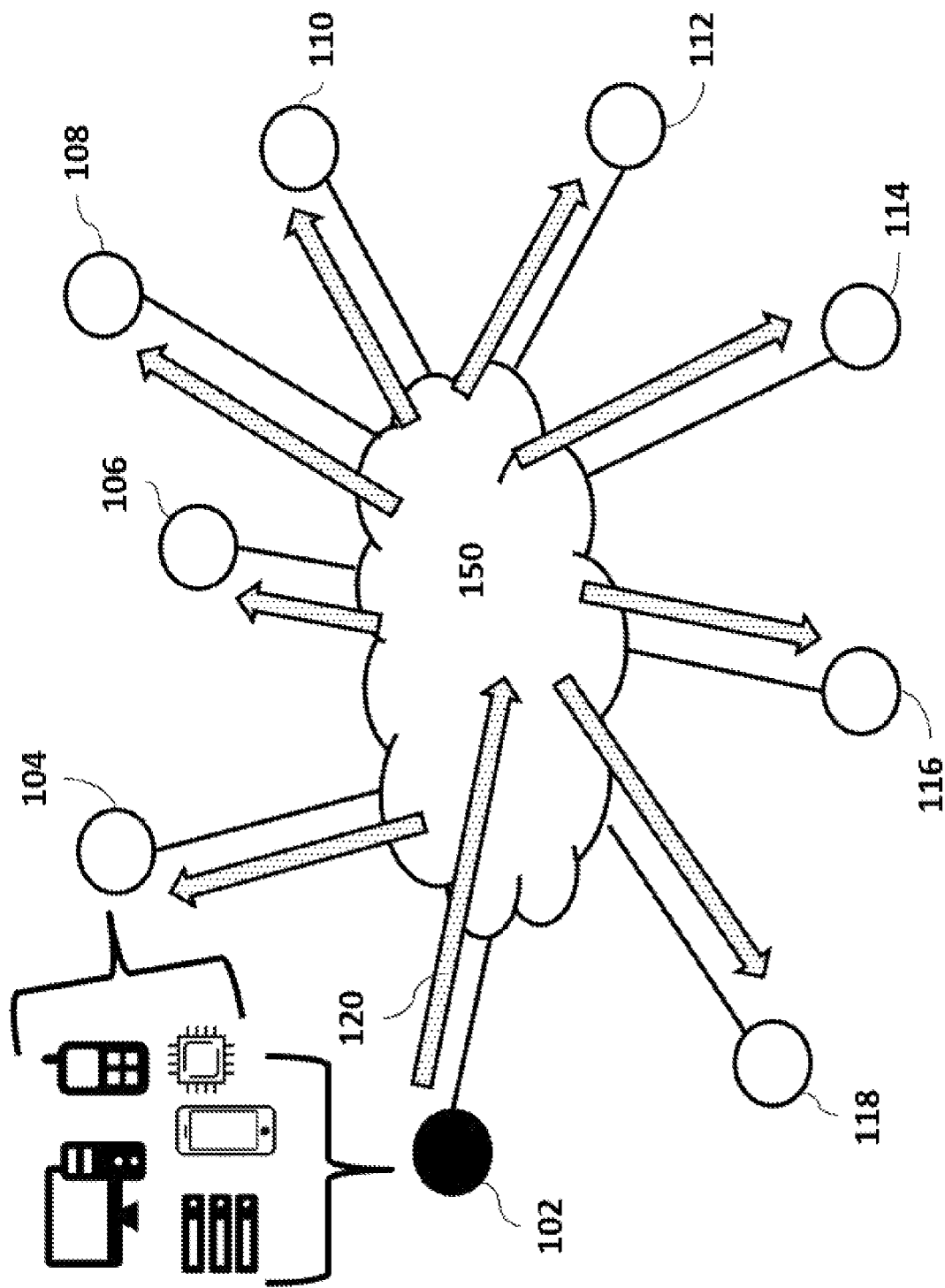
FIG. 1 illustrates a network of nodes in communication wherein a target node delivers content to a plurality of other nodes in the network.

FIG. 1 illustrates a network of nodes in communication, wherein a target node delivers content to a plurality of other nodes in the network. A computer network 150 may comprise a plurality of nodes 102-118. The plurality of nodes may be in communication with each other via the network 150. A node may be, or be associated with, a user device. For example, the node may be a phone (e.g., smartphone), handheld device, desktop computer, laptop computer, netbook, electronic tablet or similar device, networking device, personal digital assistant, wearable device, head mounted computer or display, server, processor, microprocessor, microcontroller, or any other device, component, module, subsystem or system capable of processing electronic data, or any combination thereof. The node may be a mobile device (e.g., mobile phone). A user may control, operate, and/or otherwise be associated with a node. For example, user may be an individual, an entity, a plurality of individuals, or a plurality of entities. The user may transmit, receive, access, provide commands, and/or otherwise interact with content (e.g., data) via the node.

The node may be a device capable of communicating with a network. For example, the node may comprise a network adaptor configured to communicatively couple the node and the network 150 or the node and any other device (e.g., other nodes). For example, the network adaptor may allow wired (e.g., via cables) or wireless communication (e.g., Wi-Fi, Bluetooth, Near Field Communication (NFC), etc.) between a first node and a second node. A node may be capable of transmitting content to the network 150 or to another node, receiving content form the network 150 or from another node, or both, collectively referred to herein as "communicating." For example, a transmitting node 102 may transmit content 120 to node 106, node 108, node 110, node 112, node 114, node 116, node 118, or any combination thereof via the network 150. The content may be any form of data, such as, for example, a communication (e.g., electronic mail, notification, offer, alert, alarm, etc.) comprising text (e.g., string), images, audio, and/or video. In another example, the content may be user activity data (e.g., browser history, user actions in response to a communication, etc.) that is collected, for example, from a user device. The content, in some cases, upon receipt by a receiving node (e.g., 104, 106, 108, 110, 112, 114, 116, 118, or any combination thereof) may be viewable on a graphical user interface (GUI). The content may be capable of being processed by the receiving node. The transmitting node 102 may broadcast content 120 to the network 150 of nodes, such that each receiving node receives the same content 120.

Figure 2:
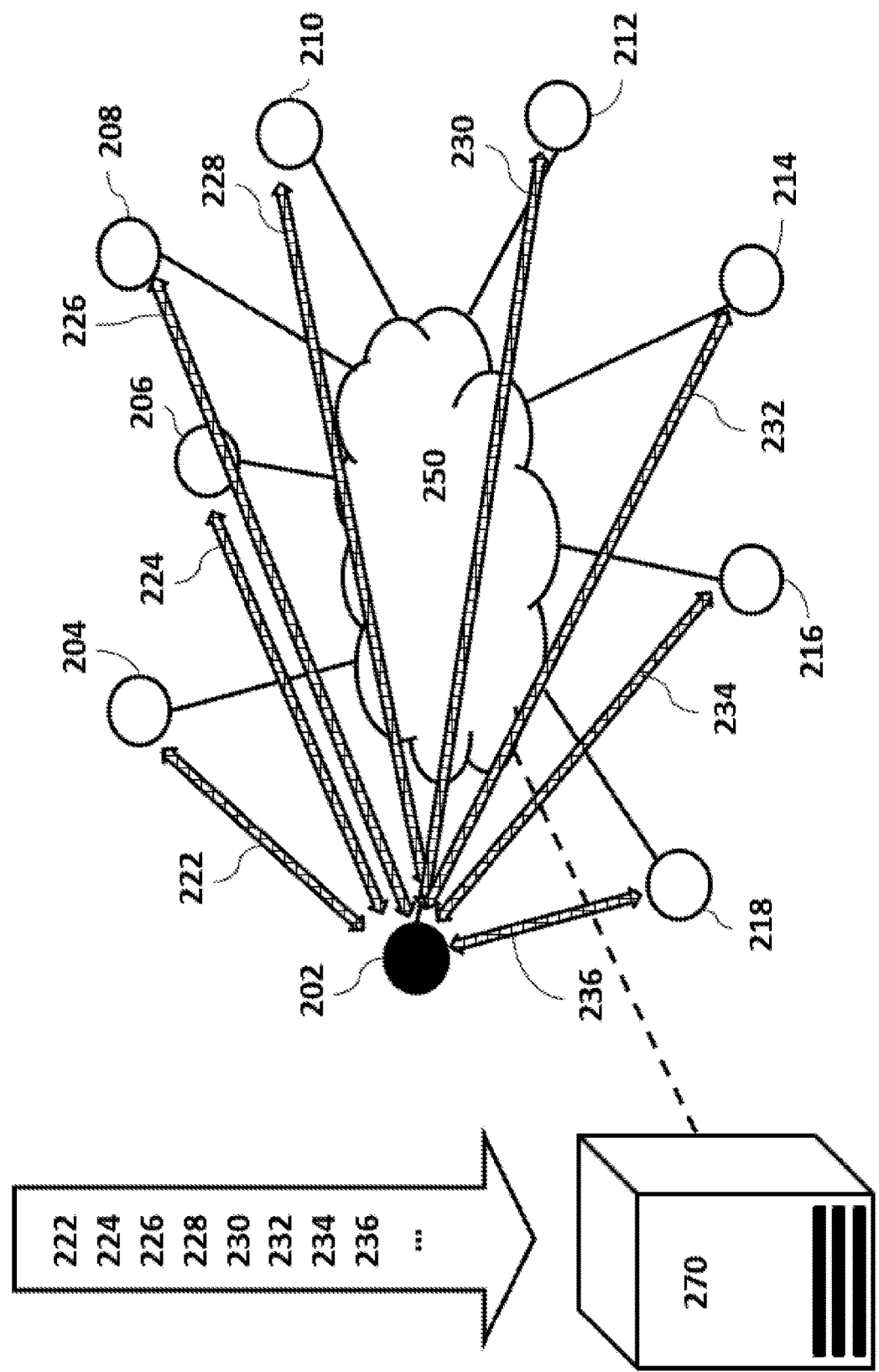
FIG. 2 illustrates a network of nodes in communication wherein node-to-node data with respect to a target node is collected by a dynamic segmentation system.

FIG. 2 illustrates a network of nodes in communication, wherein node-to-node data with respect to a target node is collected by a dynamic segmentation system. A computer network 250 may comprise a plurality of nodes 202-218. In some instances, the computer network 250 may correspond to the computer network 150, and the plurality of nodes 202-218 may correspond to the plurality of nodes 102-118, respectively, in FIG. 1.

The computer network 250 may be communicatively coupled to a dynamic segmentation system 270. The dynamic segmentation system may comprise one or more processors and memory, operatively coupled to the one or more processors, comprising instructions to dynamically segment content and/or user base, in accordance with systems and methods described elsewhere herein. For example, the dynamic segmentation system may be programmed to group one or more nodes into a cluster, and form one or more clusters of nodes to facilitate efficient content delivery over the computer network 250. The dynamic segmentation system may be configured to collect node-to-node data with respect to a target node. For example, node-to-node data 222 between target node 202 and node 204, node-to-node data 224 between target node 202 and node 206, node-to-node data 226 between target node 202 and node 208, node-to-node data 228 between target node 202 and node 210, node-to-node data 230 between target node 202 and node 212, node-to-node data 232 between target node 202 and node 214, node-to-node data 234 between target node 202 and node 216, and node-to-node data 236 between target node 202 and node 218. Node-to-node data between a target node and a first node may comprise any data that the target node has collected and/or stored with respect to the first node. In some instances, such data may comprise user activity data (of the first node), user relationship management data (between a user of the first node and a user of the target node), or other user data (e.g., geographic location, demographic, etc.) of the first node. While FIG. 2 illustrates only node-to-node data with respect to target node 202 being collected by the dynamic segmentation system, the dynamic segmentation system may collect node-to-node data with respect to any number of target nodes. Any node may be a target node. In some instances, the target node may be a transmitting node. The transmitting node may be a content generating node.

Figure 3:
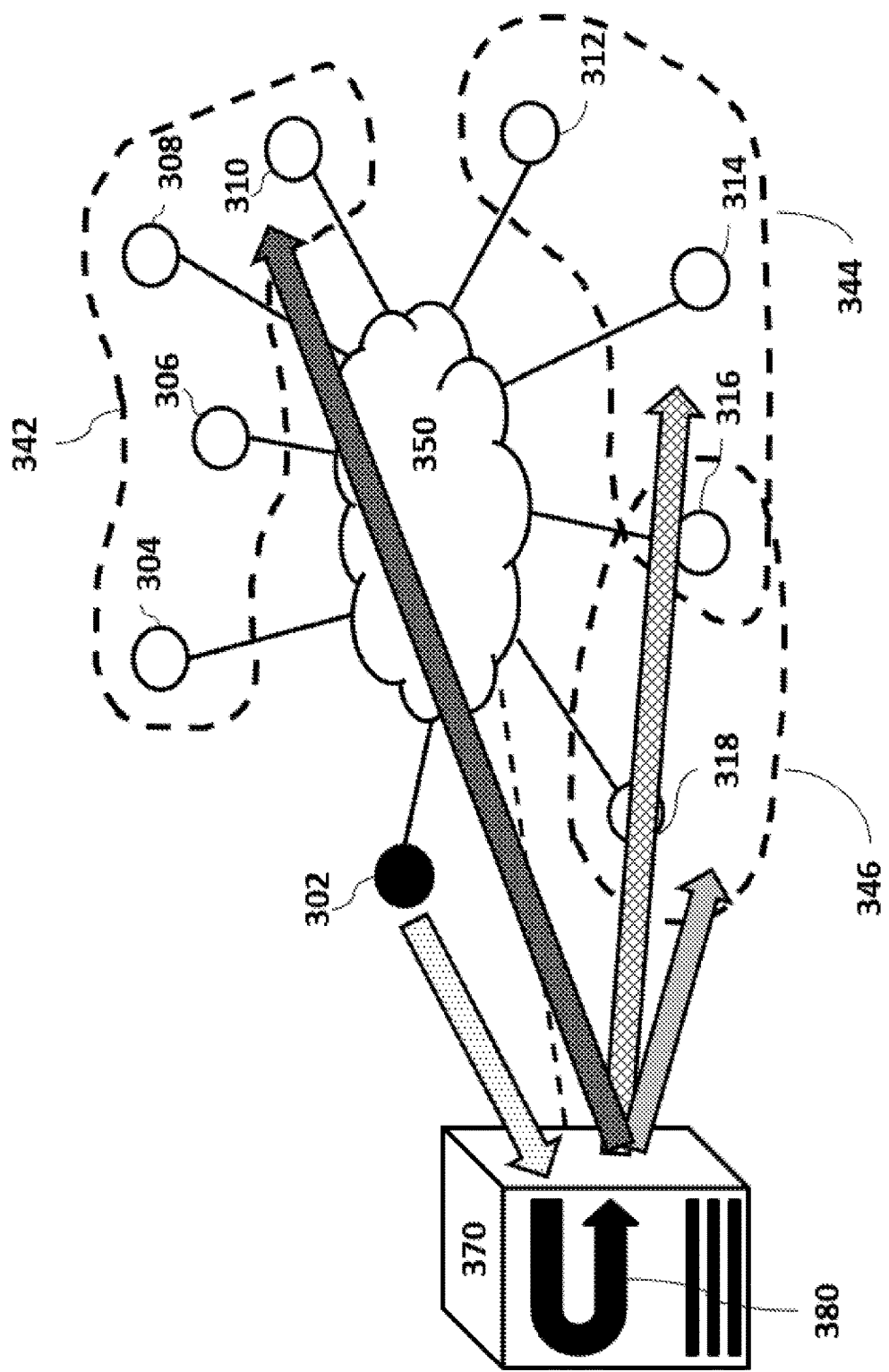
FIG. 3 illustrates a network of nodes in communication wherein a dynamic segmentation system delivers content from a target node to a plurality of other nodes based on dynamic clustering of nodes in the network.

FIG. 3 illustrates a network of nodes in communication, wherein a dynamic segmentation system delivers content from a target node to a plurality of other nodes based on dynamic clustering of nodes in the network. A computer network 350 may comprise a plurality of nodes 302-318. The computer network 350 may be communicatively coupled to a dynamic segmentation system 370. In some instances, the computer network 350 may correspond to the computer network 250, the plurality of nodes 302-318 may correspond to the plurality of nodes 202-218, respectively, and the dynamic segmentation system 370 may correspond to the dynamic segmentation system 270 in FIG. 2.

The dynamic segmentation system 370 may group the plurality of nodes 302-318 into different clusters 342, 344, 346, based at least in part on processing (380) of the node-to-node data with respect to target node 302 collected by the dynamic segmentation system 370. Further detail on such processing (380) is described elsewhere herein, such as with respect to FIGS. 4-5. The clusters may or may not overlap. For example, a first cluster 342 may group together nodes 304, 306, 308, 310, a second cluster 344 may group together nodes 312, 314, 316, and a third cluster 346 may group together nodes 316, 318. The second cluster 344 and the third cluster 346 may overlap on node 316. The clusters may be formed based on one or more factors, such as geographic location with respect to the target node (e.g., within 5 miles, within 10 miles, within same state, within same country, etc.) or duration of user relationship (e.g., no pre-existing relationship, within 1 year relationship duration, at least 1 year relationship duration, within 3 years relationship duration, at least 3 years relationship duration), frequency of user interactions between the target node and a node, types of user interactions (e.g., prior communication, prior e-mail exchange, activation of a communication from the target node by a receiving node, etc.), and the like. The clusters (e.g., 342, 344, 346) may dynamically change (e.g., constituents may dynamically change for a cluster) based on updating node-to-node data, as described elsewhere herein.

The dynamic segmentation system 370 may facilitate delivery of content from target node 302 to different nodes based on the clusters that the different nodes are grouped to. For example, of a first content that the target node 302 can transmit to the different nodes, the dynamic segmentation system may transmit a first sub-part of the first content to each of the nodes (e.g., 304, 306, 308, 310) in the first cluster 342, a second sub-part of the first content to each of the nodes (e.g., 312, 314, 316) in the second cluster 344, and a third sub-part of the first content to each of the nodes (e.g., 316, 318) in the third cluster 346. The first sub-part, second sub-part, and/or third sub-part may or may not overlap in content. The first sub-part, second sub-part, and/or third sub-part may or may not add up to the entirety of the first content. While three clusters are described, there may be any number of clusters. While three sub-parts of a content from a target node is described, there may be any number of sub-parts of a content. In some instances, a cluster of nodes may not receive any part of the content. In some instances, a node, such as an overlapping node (e.g., node 316), may receive a plurality of sub-parts of the first content. The dynamic segmentation system 370 may deliver content from the target node 302 to the receiving nodes (e.g., 304-318) via the network 350 or external to the network 350, such as via wired or wireless connections.

While each of FIGS. 1-3 illustrates only one network (e.g., 150, 250, 350) communicating with the plurality of nodes, there may be any number of networks that, individually or collectively, facilitate connection between the plurality of nodes and/or the dynamic segmentation system. While each of FIGS. 1-3 illustrates nine nodes in communication with the respective network, there may be any number of nodes in communication with each other. For example, there may be at least about 2, 3, 4, 5, 6, 7, 8, 9, 10, 20, 30, 40, 50, 100, 1,000, 10,000, 100,000, 1,000,000, 10,000,0000 or more nodes in communication via one or more networks. Alternatively, there may be at most about 10,000,0000, 1,000,000, 100,000, 10,000, 1,000, 100, 50, 40, 30, 20, 10, 9, 8, 7, 6, 5, 4, 3, 2, or less nodes in communication via one or more networks. In some instances, any node may be in communication with any other node directly or indirectly external to a network. Such direct or indirect communication may be wired (e.g., via cables) or wireless (e.g., Wi-Fi, Bluetooth, Near Field Communication (NFC), etc.).

Beneficially, the dynamic segmentation system may reduce unnecessary traffic of content delivery over the network and filter the overload of information received by the recipient users by tailoring the delivered content to be relevant for the recipient users.

Dynamic Segmentation System

Figure 4:
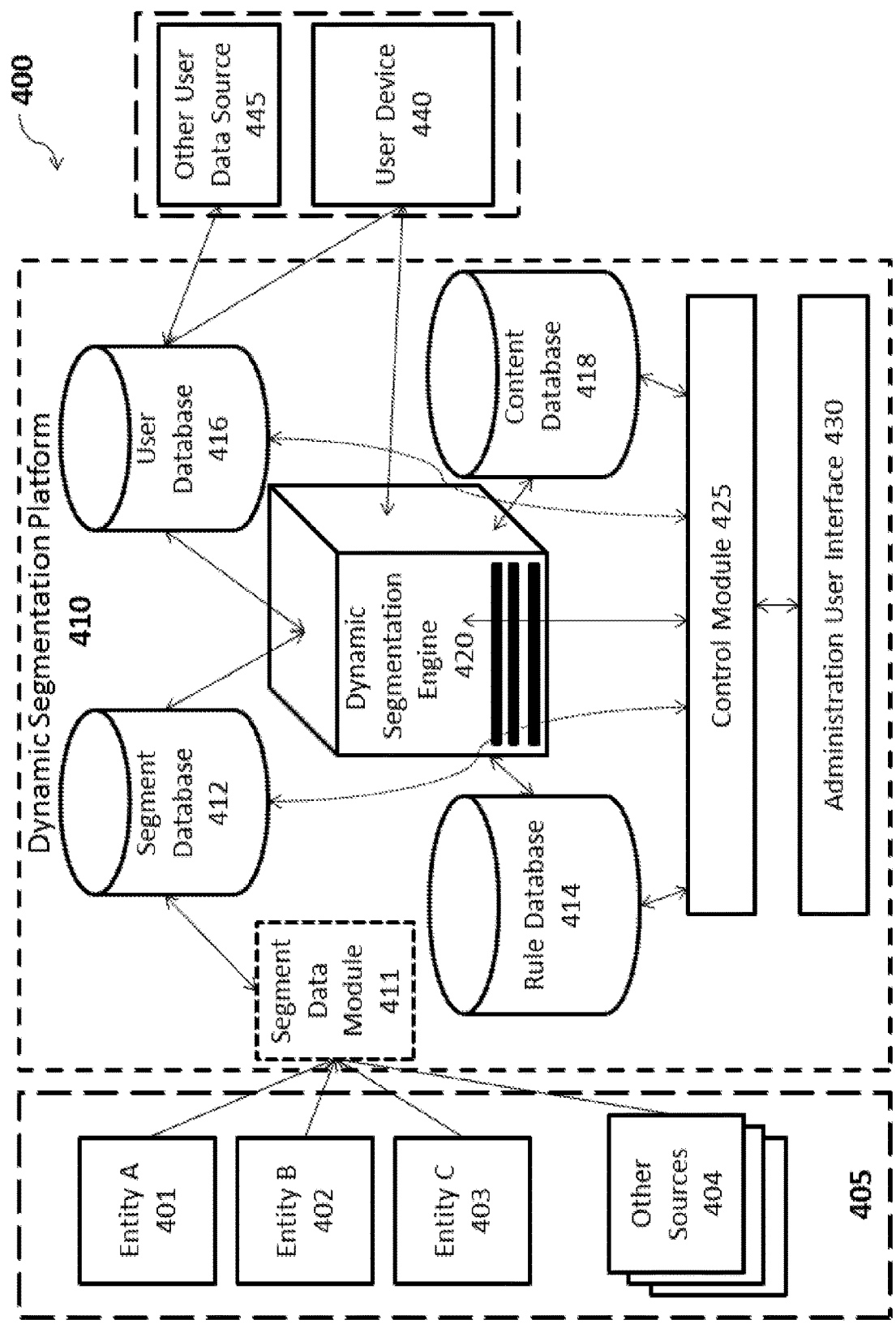
FIG. 4 illustrates an embodiment of a dynamic segmentation system.

FIG. 4 illustrates an embodiment of a dynamic segmentation system 400. In some instances, the dynamic segmentation system 400, or any element(s) thereof (e.g., dynamic segmentation platform 410) may correspond to the dynamic segmentation system 270 or 370 in FIG. 2 or 3, respectively. The dynamic segmentation system 400 may comprise user data source 405 (entities 401-403 and other data sources 404), dynamic segmentation platform 410, user device 440, and other user data source 445.

User data source 405 may comprise data from one or more entities (e.g., Nike®, Gap®, etc.)—entity A 4401, entity B 402, entity C 403—and other third-party data sources 404, which may include third-party data aggregators or warehouses. Entities A-C (401-403) and third-party data sources 404 may represent one or more nodes (e.g., computer devices, servers, or databases). Each entity may be a content transmitting node. While only three units—Entity A, Entity B, and Entity C—are shown, each unit may represent a plurality of distinct entities. Servers or databases for user data source 405 may be located on-premises at each entity site, and the software for collecting and/or organizing user data may be installed or reside on the entity's or the third-party's own servers and/or databases. Alternatively, servers or databases for user data source 405 may be located externally (i.e., cloud-based) and off-site, and data and the software for collecting the data may be stored or installed on an external, remote network. In other embodiments, servers or databases for user data source 405 may be a combination or a mix of both on-premises and cloud-based solutions. User data for an entity may correspond to node-to-node data for a target node, as described elsewhere herein. For example, such user data may comprise data of users that may or may not have had prior interactions with the entity. In some instances, the users may be customers, potential customers, partners, potential partners, and the like, of the entity. While described as 'entities,' the entities may be any other user that generates and/or transmits communication content to other users.

Segment data module 411 may be communicatively coupled to user data source 405, and may be configured to obtain or receive user data. The obtained user data may then be transmitted to be stored in the segment database 412. Alternatively, user data source 405 may be communicatively coupled to the segment database 412, and the segment database may be configured to request transmittal of segment data to be stored in the segment database 412.

User data may include any data an entity can collect from a user, which may include, for example, user relationship management (URM) data and user activity data, or other user data (e.g., geographic location, demographic, etc.) of the first node. URM data generally refers to compiled user information across different channels (or points of contact between the user and the entity), which may include the entity's website, telephone, live chat, direct mail, published materials and social media. URM data may include, but is not limited to, email address, phone number, other contact information, user ID, duration of user relationship with the entity (e.g., no pre-existing relationship, within 1 year relationship duration, at least 1 year relationship duration, within 3 years relationship duration, at least 3 years relationship duration), user account history (e.g., activation history, communication history, transaction history, etc.), frequency of user interactions (e.g., communication frequency, purchase frequency, activation frequency, etc.), geographic location with respect to the entity (e.g., within 5 miles, within 10 miles, within same state, within same country, etc.), types of user interactions (e.g., prior communication, prior e-mail exchange, activation of a communication from the entity by the user, etc.), and the like.

Users may be categorized into a segment or a plurality of segments (or clusters, used interchangeably herein). Segments may be based on one or more differentiators that divide users into groups. Information such as users' demographics (age, race, religion, gender, family size, ethnicity, income, education level), geography, behavioral tendencies, account history, any other URM data may serve as bases or variables for determining user segmentation.

Segment database 412 may store segment data. The segment database may be communicatively coupled to segment data module 411. The segment data module may be configured to obtain and process user data—which may be obtained from user data source 405—into segment data. Segment data may comprise, for example, 1) a segment or segments to which a user has been assigned to, and 2) an identifier for the user (e.g., hash of a user's email). Segments may be based on geographic segmentation (based on country, region, population density, city size, etc.), demographic segmentation (based on age, gender, occupation, social class, marital status, income, etc.), psychographic segmentation (based on values and lifestyle), behavioral segmentation (based on user account history, purchase history, benefit-sought, user status, usage rate/transaction frequency, loyalty status, readiness, attitude to product or service, etc.), generational or cultural segmentation. Identifiers for the user may include, but is not limited to, a hash of the user's email address, hashed phone number or other contact information of the user, registered ID (e.g., loyalty ID), tokens in the cookies, and other group identifiers (e.g., IDFA, AAID, Unique Device Identifier (UDID), and the like. Segment data module 411 may be configured to normalize the segment data to be stored in the segment database 412.

Segment data module 411 may be part of a dynamic segmentation platform 410. The dynamic segmentation platform may be configured to locally process the user and user data into segment data, which may be aggregated and stored in the segment database 412. In some embodiments, segment data module 411 may be located or installed remotely at the user data source 405. In other embodiments, segment data module may be operated by a third-party. Alternatively, if user data source 405 stores segment data or is able to generate segment data, the segment data module 411 may not be necessary for the dynamic segmentation platform or may only be used, for example, for data normalization and the like. The user data source may directly transfer segment data to the dynamic segmentation platform, and the segment data may be directly stored in the segment database 412.

User data, or segment data associated with users, may be transmitted from user data source 405 to dynamic segmentation platform 410, via a data pull or a data push, over one or more types of communication channels (e.g., wired or wireless network). In some embodiments, the data transfer may be via one or more types of application programming interfaces (APIs) provided by the dynamic segmentation platform or one or more internet protocols for transmitting files between computers (e.g., file transfer protocol (FTP), SSH file transfer protocol (SFTP), or any variants thereof). The APIs may be a web service (e.g., RESTful APIs, etc.) or defined as a set of hypertext transfer protocol (HTTP) request messages, along with a definition of the structure of response messages, which may or may not be in an Extensible Markup Language (XML) or JavaScript Object Notation (JSON) format.

Dynamic segmentation platform 410 may comprise segment database 412, rule database 414, user database 416, content database 418, dynamic segmentation engine 420, control module 425, and administration user interface 430.

Control module 425 may be communicatively coupled to segment database 412, rule database 414, user database 416, content database 418, dynamic segmentation engine 420, and administration user interface 430. Rule database 414 may store rule data, which may include, for example, regions of eligibility for a communication content, age restrictions, and segments eligible for a communication content. The control module may be configured to store one or more content data and rule data based on inputs from the administration user interface. Content data and rule data may be generated or inputted manually via the administration user interface or may be automatically generated or provided based on the goal of a project (if configured), which may be specified by the administration user interface 430. The project may be a campaign to achieve one or more goals or objectives.

Content database 418 may store content data. Content data may include at least one of the following: content provider identity, content and product description, activation parameters such as the content amount, content expiration date, content volume, and activation rate. In some instances, the content data may comprise communications content. In some instances, the content data may be activated via user action (e.g., viewing of a target product, purchase of a target product) or other user response, such as for redemption of a credit. In some embodiments, content database may also store or keep track of historical or projected values on relevant content parameters or variables. Examples of such data may include, but are not limited to, data on historical, current, or projected values on: content activation rate, content volume, number of content activations, profit per content impression, profit margin, trends in contents made available by an content provider, number of content impressions, impact of the content on sales of a product, number of content redemptions, number of products sold, content yield, impact of an content on other contents, impact of an content on user behavior, savings value of a digital content, the click-through rate of a digital content, and other relevant data on contents and content activation. In other embodiments, the aforementioned data may be stored in other databases or modules, including the dynamic segmentation engine 420 or the control module 425. Alternatively, the dynamic segmentation platform 410 may be configured to provide data analytics on information related to all contents and their activation, which may be accessible via the administration user interface 430. The administration user interface may be configured to provide adjustable parameters or variables to generate, calculate, or derive one or more of the aforementioned content or project related data.

User database 416 may be communicatively coupled to user device 440, other user data source 445, and dynamic segmentation engine 420. The user database may be configured to store user data, which may be obtained or received from the user device or other data sources. User data may include, but is not limited to, user name, user identifier, email, contact information, demographic information, shopping preferences, and previous transaction information. For example, such user data is differentiated from the user data collected by the entities (e.g., 401-403) in that they are collected without entity input.

User device 440 may be a mobile device (e.g., smartphone), handheld device, desktop computer, laptop computer, netbook, electronic tablet or similar device, networking device, personal digital assistant, wearable device, head mounted computer or display, or any other device, component, module, subsystem or system capable of processing electronic data, or any combination thereof. In some embodiments, the user device may be a smartphone with a mobile application installed, and the mobile application may be configured to download and display content. The user device may be configured to be communicatively coupled to the dynamic segmentation platform 410 via the mobile application. The mobile application may be configured to provide a user interface for the user to view one or more communications content on their mobile device. The user may also select/view/redeem/activate/search one or more communications content from a plurality of communications contents via the user interface provided by the mobile application. The mobile application may require or request the user to log in to the application—via validation of login credentials—in order to receive/download communications contents. By logging in to the platform via the mobile application, the user may be provided with individualized and customized, relevant communications content based at least in part on prior user activity data (e.g., purchase history or transaction pattern). Therefore, the mobile application may enable a logged-in experience for users, while providing the dynamic segmentation platform with information or data essential for generating and delivering customized and individualized communications content. The mobile application may also be configured to transmit data related to the user, including information related to the user device (e.g., device ID). Other user data source 445 may include other devices or systems that may collect information on the user or the user environment.

Administration user interface 430 may be communicatively coupled to a control module 425, and may be configured to provide an interface for receiving commands or data for the dynamic segmentation platform 410. The administration user interface may also be configured to generate, receive, or display information related to communications content data, user data, segment data, rule data, performance measures, or any other information related to the distribution and activation of communications content. Content data, rule data, segment data, user data, project goals, and other content-related parameters or settings may be controlled, configured, or accessed via the administration user interface. In some embodiments, the administration user interface is a graphical user interface (GUI). In other embodiments, the administration user interface is a command line interface.

Dynamic segmentation engine 420 may be communicatively coupled to segment database 412, rule database 414, user database 416, content database 418, control module 425, and user device 440. The dynamic segmentation engine may be configured to apply one or more algorithms to data stored in segment database 412, rule database 414, user database 416, content database 418, in order to determine whether a specific content should be presented to a specific user device 440 or the user associated with the user device. In some embodiments, contents for each segment are selected according to the rule data, and the dynamic segmentation engine may be configured to present the users with contents according to their associated segments, based on the segment data. The dynamic segmentation engine may comprise one or more processors and memory, operatively coupled to the one or more processors, to perform the systems and methods described herein.

In other embodiments, dynamic segmentation platform 410 may be configured to use one or more algorithms—based on the goals or one or more objectives of a project (e.g., communications delivery project)—to generate or obtain an optimal combination or mix of contents and rules, for each user segment (or cluster). Project goals may be determined or specified by the entity or other entities interested in providing tailored contents to users that may or may not have pre-existing relationships with the entity or the other entities (e.g., current or potential customers). Examples of project goals may include, but are not limited to the following: acquire "N" number of new user relationships; acquire "N" number of new user relationships in a particular demographic (age, gender, purchaser of similar products from competitive or complementary brands); increase presence or dominance share at particular locations; reactivate "Y" number of lapsed user relationships; acquire "N" number of new user relationships in a particular geographic region; use "X" amount of budget in a certain number of days; drive users to activate a communication content on certain days of the week, and the like. Project goals may also be a combination of any one or more of the above. Any features or may be utilized in forming a project goal to optimize the contents and rules for delivery of such contents.

In some embodiments, the dynamic segmentation platform 410 may also be configured to dynamically adjust contents and/or rules based on the performance of a project to better achieve the goals of the project. In another embodiment, the dynamic segmentation platform may be configured to dynamically adjust contents based on one or more algorithms to meet the goals of the project or improve project performance. For instance, the dynamic segmentation platform may dynamically or algorithmically adjust what contents or content amounts are provided to what users, based on real-time or near real-time user activity data (e.g., activation data), or user activity data collected during a certain pre-determined time interval. The dynamic segmentation platform may keep track of various information sources and historical data, to achieve optimal project performance. Information sources may include, but not limited to, past project performance, other activity data, current information such as the day of week, weather, and other real-time data, activation rates on current contents at various content amounts, or user information on users activating contents. The specific process of aggregating data and presenting a user with a specific, dynamically segmented content is further described in FIG. 5 of this disclosure.

Dynamic Segmentation Process

Figure 5:
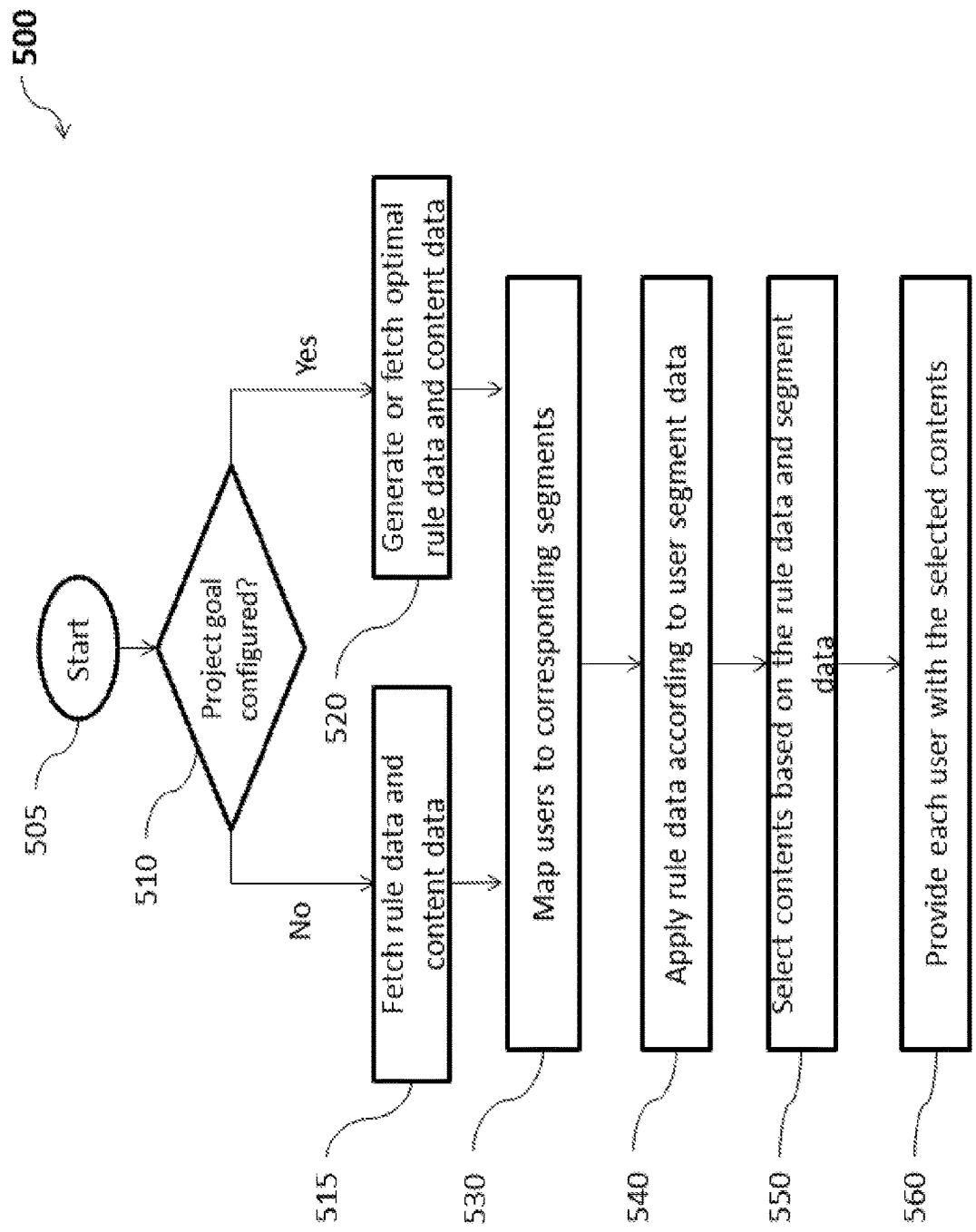
FIG. 5 illustrates a flow diagram for generating and providing dynamically segmented communications.

FIG. 5 illustrates a flow diagram 500 for generating and providing dynamically segmented digital content. One or more algorithms may be applied by a dynamic segmentation platform (e.g., the dynamic segmentation platform 400) to provide users with specific communications content on one or more of their devices. Relevant data may be collected by the dynamic segmentation platform, based on applicable algorithms. Once the dynamic segmentation process is initialized (505), the dynamic segmentation platform may be configured to check whether or not any project goals are configured or specified for the entity (operation 510). If no project goals are configured, the dynamic segmentation platform may check whether or not the rule data and the content data are present in their respective databases, and fetch the corresponding rule data and content data (operation 515). If, however, the project goals are configured for the particular entity, the dynamic segmentation platform may be configured to generate or obtain a combination of rules and contents (e.g., content type, content activation parameters, etc.), which is optimized based on the goal of the project (operation 520). Once the rules and contents are obtained or generated in previous operations, user segment data may be obtained or received from entities (e.g., content generating and/or transmitting users), or other data aggregators. Such data may have been pre-fetched or stored in one or more databases associated with the dynamic segmentation platform. In some embodiments, segment data may already be stored in the segment database 412, in which case the segment data may be fetched from the database. Next, segment data stored in a segment database (e.g., segment database 412) may be matched with user data stored in a user database (e.g., user database 416) to determine the segments to which a user belongs (operation 530). For example, a user identifier in the segment data is matched to a user identifier in the user data, and the user may be mapped to an appropriate segment based on the segment data. Next, rule data may be retrieved or obtained according to one or more segments in which the user belongs to (operation 540). For example, if the user is categorized under "segment YY", obtained rule data for a content may specify "only users in segment YY". At operation 550, specific contents may be selected based on the application of one or more user appropriate rule data, which was identified at operation 540. For example, for a user in segment YY, rule data stating "only users in segment YY" may be applied to obtain or retrieve all corresponding contents. Next, the user or a user device associated with the user may be presented with the selected contents in the previous operation (operation 560). In some embodiments, the contents are provided via a user interface on a mobile application of the user.

Example Applications of Dynamic Segmentation

In one instance, a dynamic segmentation process may be applied to user data from a certain provider entity (which can also be any other entity providing products or services or otherwise interacting with a plurality of users). For example, Entity A—a major provider—may desire to provide different credits to different segments of its user base. For example, Entity A's user base may comprise users that frequently interact with Entity A, such as partners or customers or manufacturers or associates. Entity A can potentially divide its users into three clusters: (i) frequent (or "loyal") users that have above a certain frequency of interactions (e.g., communications, activations, etc.) with Entity A; (ii) infrequent (or "lapsed") users that have below a certain frequency of interactions or users that have not interacted with Entity A for a certain duration of time; (iii) users who do not have preexisting relationships with Entity A and thus have no prior interactions ("new" users). In order to achieve different objectives for each segment of users, Entity A may want to provide different types or amounts of credits to each user based on their segment, conditional to activation by the user: with respect to frequent users, Entity A may want to present such users with content that will increase the preexisting interaction level of the user with Entity A (e.g., activity of the user with Entity A, such as an average amount such users are spending at Entity A (e.g., $10 off $400 spent)); with respect to lapsed users, Entity A may want to present such users with content that will increase the number of interactions such users are making with Entity A, and they may be presented with a recurring content or a content that requires multiple interactions (e.g., multiple/cumulative trips/purchases) for activation; and with respect to new users, Entity A may want to present such users with contents that will get users to start new user relationships with Entity A (e.g., $15 off $50 spent). Entity A may flexibly deliver customized content to a user in each segment by having its system and servers communicatively coupled to a dynamic segmentation platform (e.g., dynamic segmentation platform 410). First, Entity A (e.g., Entity A 401) may pass its segment data to the dynamic segmentation platform via, for example, an API call to the dynamic segmentation platform (e.g., SFTP). Entity A's segment data can include 1) the segments (e.g., "loyal", "lapsed", and "new") for each user (based on Entity A's URM data), and 2) the hashed email. The hashed email may be used to identify and match the user to the user data stored on the dynamic segmentation platform. Next, the dynamic segmentation platform ingests the segment data, and stores it in a database (e.g., segment database 412). The dynamic segmentation platform may also be configured to store user data, which may be collected, for example, from user devices (e.g., smartphones or other mobile devices) with mobile applications installed, or other sources of user data. The segment data and the user data (which may be stored in a user database (e.g., user database 416)) can be correlated to determine the set of segments each user belongs to. Next, content data may be inputted via an administration user interface (e.g., administration user interface 430). The administration user interface may be utilized to specify details of the content data, dictating which contents from Entity A are available to which users. For example, content data may include rule-based information such as, for example, "$10 off $50 spent" or "$10 off $400 spent". Such content data may be stored in a content database (e.g., content database 418). Content data may have already been stored on the dynamic segmentation platform, and the system may be configured to check whether relevant or applicable content data exists in the database. The content data may also be generated automatically based on, for example, the entity's project goals. The content data may also be transmitted directly from an entity to the dynamic segmentation platform.

Rules may also be inputted via the administration user interface. Rule data may specify contents available or applicable to each user segment. For example, a rule data may state "only users in segment 'new'" or "only users in segment 'loyal'". Rule data may be stored in a rule database (e.g., rule database 414). Rule data may have already been stored on the dynamic segmentation platform, and the system may be configured to check whether relevant or applicable rule data exists in the database. The dynamic segmentation platform may be configured to determine which contents to present to each user via a dynamic segmentation engine (e.g., dynamic segmentation engine 420). The dynamic segmentation engine may be configured to evaluate rules (from the rule database) against the segment data retrieved from the segment database. For example, the communication content "$10 off $50 spent" may be associated with a rule data stating "only users in segment 'new'". Thus, only users who do not have preexisting user relationships with Entity A may be presented with the "$10 off $50 spent" communication content. This communication content may be presented directly on the user's device (e.g., smartphone) via an application.

In another instance, a dynamic segmentation process may be applied to user segment data from third-parties. In one embodiment, a third-party collects user activity data originating from various applications (e.g., mobile applications) on user devices (e.g., smartphones). For example, the third-party may maintain a database of user activity data for a given user, and may assign users with no preexisting user relationships with respect to a transmitting user to a "new" segment, and assign users with preexisting user relationships with respect to the transmitting user to an "active" segment. Such segment data may be transmitted to a dynamic segmentation platform (e.g., dynamic segmentation platform 410) by an API call. For example, the third-party may invoke the REST API provided by the dynamic segmentation platform. Segment data may include segments (e.g., "new" or "active") for each user stored on other entities' systems or servers that the third-party has integrated with. The third-party may, for example, track a user's activities (e.g., browsing history, purchases, registrations, etc.) made through an entity's (integrated with the third-party) mobile applications. Whenever a user performs an activity on an entity's mobile application, the third-party may make an API call to transmit an updated user's segment data (e.g., from "new" to "active") stored in the dynamic segmentation platform. The dynamic segmentation platform may ingest the segment data and store it in a segment database (e.g., segment database 412). Rules may be inputted via the administration user interface. Rule data may specify contents available or applicable to each user segment. For example, a rule data may state "only users in segment 'new'" or "only users in segment 'active'". Rule data may be stored in a rule database (e.g., rule database 414). A dynamic segmentation engine (e.g., dynamic segmentation engine 420) may be configured to determine which contents to present to each user by evaluating the rules (retrieved from the rule database) against the segment data (retrieved from the segment database). For example, all contents associated with the "only users in segment 'new'" rule may be presented to users in the "new" segment. The segment data in the segment database may be continuously updated based on user activity data monitored through the third-party. The dynamic segmentation platform may be configured to periodically (e.g., hourly, nightly, weekly) fetch the segment data from the third-party's database.

Beneficially, the dynamic segmentation system may reduce unnecessary network traffic by filtering 'broadcasted' communications in the network, such that only relevant content is delivered to relevant users. Such relevance, as described elsewhere herein, may be updated in real-time based on user activity data. Such user activity data may be collected from both a transmitting user node (e.g., server) and a receiving user node (e.g., user device) to map the delivery of a relevant communication. Advantageously, a transmitting user may deliver content to other relevant users and a receiving user may receive content from other relevant users. The systems and methods provided herein may increase communication efficiency.

Computer Control Systems

Figure 6:
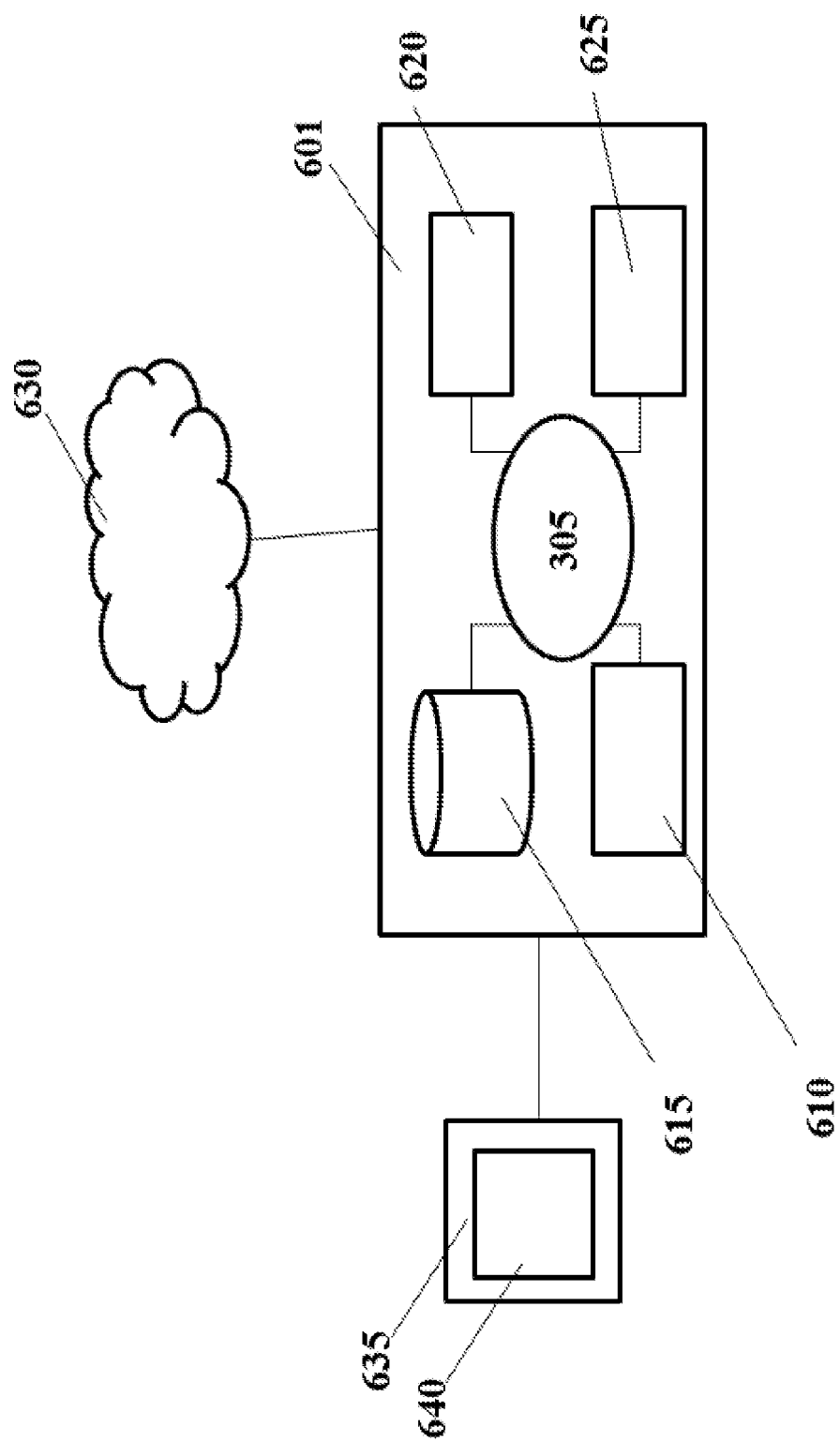
FIG. 6 shows a computer control system that is programmed or otherwise configured to implement methods provided herein.

The present disclosure provides computer control systems that are programmed to implement methods of the disclosure. FIG. 6 shows a computer system 601 that is programmed or otherwise configured to dynamically segment a plurality of users into a cluster of users and generate and provide dynamically segmented content to users. The computer system 601 can regulate various aspects of FIGS. 1-5 of the present disclosure, such as, for example, dynamic segmentation platform 410, dynamic segmentation engine 420, control module 425, administration user interface 430, flow chart illustrated in FIG. 5, and various example applications of the dynamic segmentation system described herein. In some instances, the computer system 601 may correspond to any node, such as a server, processor, or user device, described herein. In some instances, the computer system 601 may correspond to a dynamic segmentation system or a dynamic segmentation platform or a dynamic segmentation engine as described herein.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. For example, the dynamic segmentation platform can be operatively coupled to the computer network 630 with the aid of the communication interface 620.

The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server. For example, behaving as a server system, the computer system 601 may represent the dynamic segmentation platform (e.g., dynamic segmentation platform 410). The communication interface 620 may provide a wired or wireless connection with one or more user devices (e.g., the user device 440), wherein the one more user devices may be a mobile device.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback. The CPU 605 can be part of a circuit, such as an integrated circuit. One or more other components of the system 601 can be included in the circuit. In some cases, the circuit is an application specific integrated circuit (ASIC). For example, the CPU 605 can be a part of the dynamic segmentation platform 410 and the CPU 605 can be configured to implement the method described in the flow chart of FIG. 5 or other methods described herein.

The storage unit 615 can store files, such as drivers, libraries and saved programs. The storage unit 615 can store user data, e.g., user preferences and user programs, or any other data or information described herein. The storage unit 615 can represent one or more components of the dynamic segmentation platform. For example, the storage unit 615 can represent the segment database, the user database, the rule database, or the content database. Files or information stored in the storage unit 615 can include user data, content data, rule data, campaign related data, redemption related data, and other data related to the dynamic segmentation platform 410 and its operations. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user (e.g., mobile device, smartphone, tablet). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630. For example, one or more user devices (e.g., user device 440) can access the dynamic segmentation platform 410 via the network 630. The user devices can receive contents (e.g., communications content) and content data from the dynamic segmentation platform via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can represent the dynamic segmentation platfrom 410 and include or be in communication with an electronic display 635 that comprises a user interface (UI) 640 for providing, for example, segment data, user data, content data, rule data, project related data, or any other data related to contents and project performance. In another embodiment, the computer system 601 can represent one or more user devices (e.g., user device 440) that comprise a user interface 640 for providing, for example, segmented contents to the mobile application users. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, optimize contents and rules to achieve one or more project goals, update contents and rules based on real-time tracking of content activation (e.g., redemption) and user activity data, implement the process illustrated in FIG. 5, and other methods described herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for delivering content to a cluster of receiving nodes in a computer network, comprising:
   (a) segmenting, by one or more processors, a plurality of receiving nodes in the computer network into a first plurality of clusters of nodes based at least in part on a first set of user data that (i) is obtained from a transmitting node associated with a transmitting user and (ii) comprises user data of a plurality of users with respect to the transmitting user;
   (b) mapping and delivering, by one or more network adaptors, over the computer network, a communication content received from the transmitting node to one or more clusters of the first plurality of clusters of nodes based on rule data associated with the communication content;

(c) obtaining, by the one or more processors, a second set of user data from one or both of nodes of the one or more clusters and the transmitting node, wherein the second set of user data comprises user activity data of users, with respect to the communication content, associated with the nodes of the one or more clusters; and (d) segmenting, by the one or more processors, the plurality of receiving nodes in the computer network into a second plurality of clusters of nodes based at least in part on the first set of user data and the second set of user data.

2. The method of claim 1, wherein the second plurality of clusters of nodes are dynamically segmented in real-time upon receipt of the second set of user data.

3. The method of claim 1, wherein a first receiving node of the plurality of receiving nodes is segmented into at least two different clusters of nodes in the first plurality of clusters of nodes.

4. The method of claim 1, wherein the user data in the first set of user data comprises one or more of a user identifier, user contact information, geographic distance from the transmitting user, user relationship duration with the transmitting user, and frequency of user interaction with the transmitting user.

5. The method of claim 1, wherein the rule data further comprises geographic regions of eligibility, age restrictions, or both for the communication content.

6. The method of claim 1, wherein a given receiving node is grouped to a given cluster of nodes based at least in part on one or more of (i) a geographic location, (ii) user relationship duration with the transmitting user, (iii) frequency of user interaction with the transmitting user, (iv) demographic, (v) user behavioral information, and (vi) user psychographic information, of a given receiving user associated with the given receiving node.

7. The method of claim 1, wherein the communication content is activatable by the plurality of receiving nodes.

8. The method of claim 7, further comprising tracking, by the one or more processors, an activation of the communication content by the plurality of receiving nodes and storing the activation activity in the first set of user data, the second set of user data, or both.

9. A computer system for delivering content to a given cluster of receiving nodes in a computer network, comprising:

a network adaptor in communication with the computer network, wherein the network adaptor is in communication with a plurality of nodes including a transmitting node and a plurality of receiving nodes;

one or more databases comprising a first set of user data, a second set of user data, and a communication content associated with rule data, wherein the first set of user data (i) is obtained from a transmitting node associated with a transmitting user and (ii) comprises user data of a plurality of users with respect to the transmitting user, wherein the second set of user data comprises user activity data of users, with respect to the communication content; and one or more processors, individually or collectively, configured to:

segment the plurality of receiving nodes in the computer network into a first plurality of clusters of nodes based at least in part on the first set of user data;

use the network adaptor to map and deliver the communication content, over the computer network, to one or more clusters of the first plurality of clusters of nodes based on the rule data associated with the communication content;

obtain the second set of user data from one or both of nodes of the one or more clusters and the transmitting node, wherein the nodes are associated with the users of the one or more clusters; and segment the plurality of receiving nodes in the computer network into a second plurality of clusters of nodes based at least in part on the first set of user data and the second set of user data.

10. The computer system of claim 9, wherein the one or more processors are individually or collectively configured to dynamically segment the plurality of receiving nodes into the second plurality of clusters of nodes in real-time upon receipt of the second set of user data.

11. The computer system of claim 9, wherein the one or more processors are individually or collectively configured to segment a first receiving node of the plurality of receiving nodes into at least two different clusters of nodes in the first plurality of clusters of nodes.

12. The computer system of claim 9, wherein the user data in the first set of user data comprises one or more of a user identifier, user contact information, geographic distance from the transmitting user, user relationship duration with the transmitting user, and frequency of user interaction with the transmitting user.

13. The computer system of claim 9, wherein the rule data further comprises geographic regions of eligibility, age restrictions, or both for the communication content.

14. The computer system of claim 9, wherein the one or more processors are individually or collectively configured to assign a given receiving node to a given cluster of nodes based at least in part on one or more of (i) a geographic location, (ii) user relationship duration with the transmitting user, (iii) frequency of user interaction with the transmitting user, (iv) demographic, (v) user behavioral information, and (vi) user psychographic information, of a given receiving user associated with the given receiving node.

15. The computer system of claim 9, wherein the communication content is activatable by the plurality of receiving nodes.

16. The computer system of claim 15, wherein the one or more processors are individually or collectively configured to track an activation of the communication content by the plurality of receiving nodes and storing the activation activity in the first set of user data, the second set of user data, or both in the one or more databases.

* * * * *